Dec. 1, 1925.
W. T. HENSLEY
1,563,629
UNIVERSAL JOINT
Original Filed Dec. 19, 1919    2 Sheets-Sheet 2
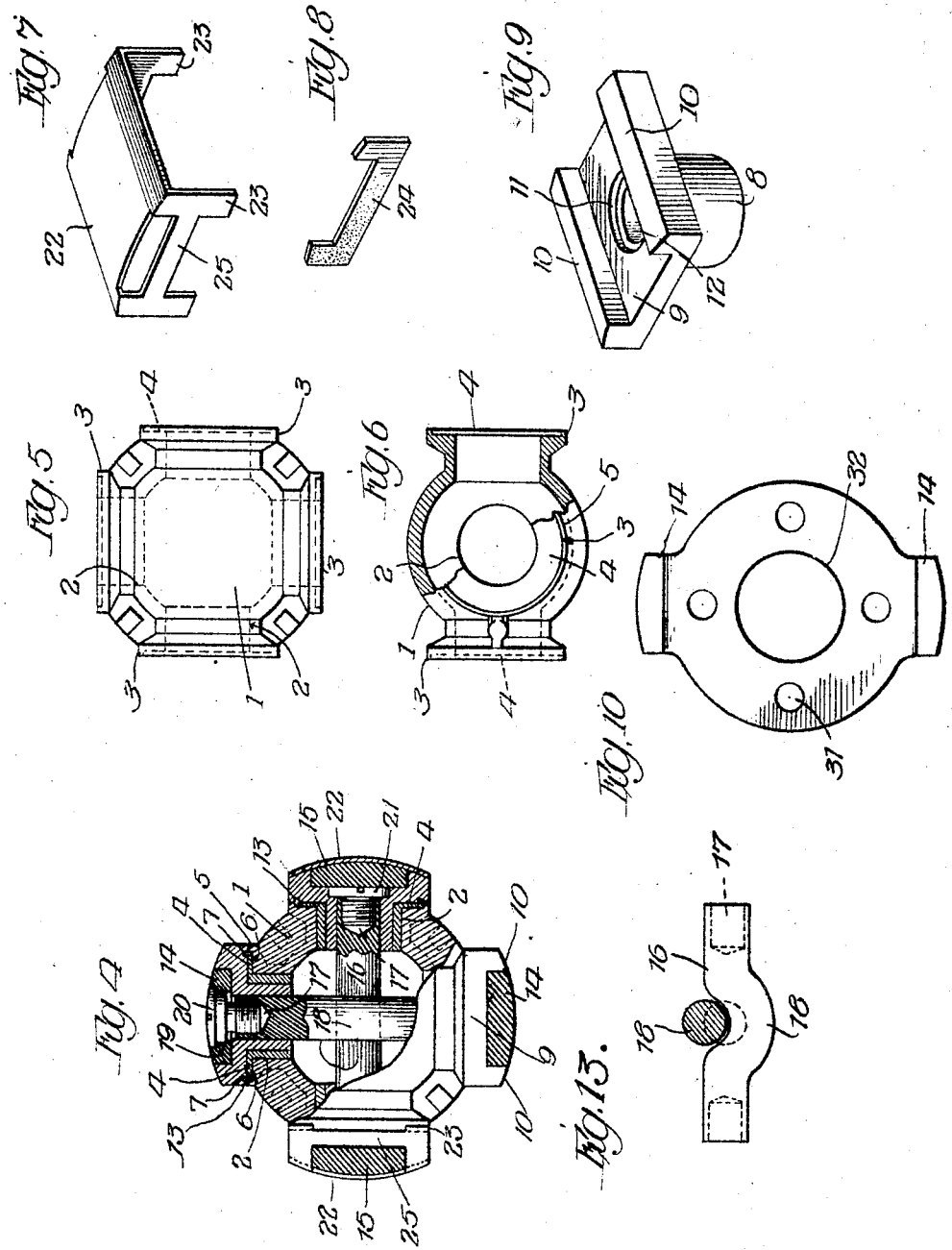
Inventor
William T. Hensley
By Arthur F. Durand
Atty.

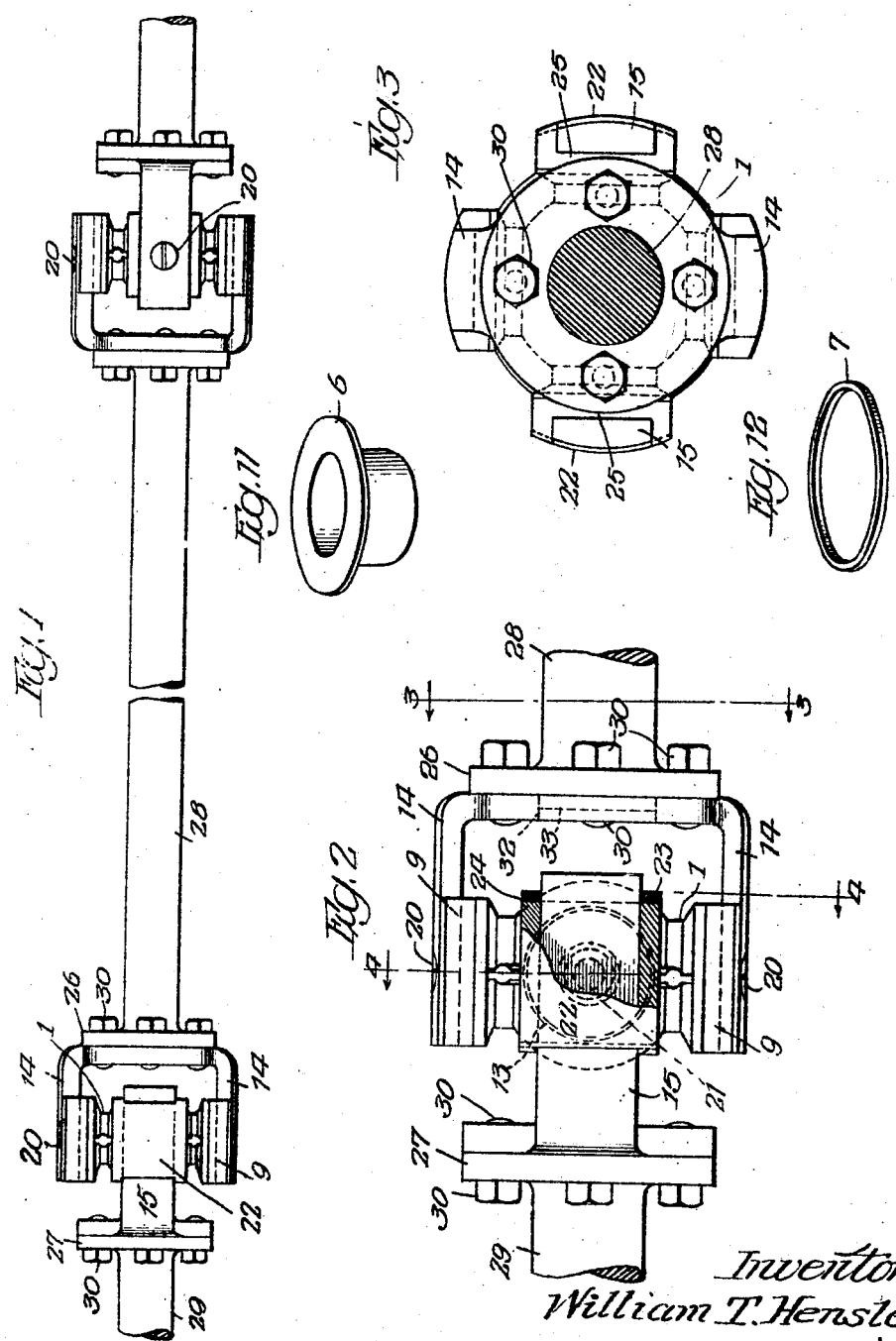

Patented Dec. 1, 1925.

1,563,629

UNITED STATES PATENT OFFICE.

WILLIAM T. HENSLEY, OF INDIANAPOLIS, INDIANA.

UNIVERSAL JOINT.

Application filed December 19, 1919, Serial No. 345,969. Renewed July 2, 1925.

*To all whom it may concern:*

Be it known that I, WILLIAM T. HENSLEY, a citizen of the United States of America, and a resident of Indianapolis, Indiana, have invented a certain new and useful Improvement in Universal Joints, of which the following is a specification.

My invention relates to universal joints for use on automobiles, and for other purposes.

Generally stated, the object of my invention is to provide an improved and highly efficient universal joint having provisions for satisfactory lubrication and adjustment thereof.

A special object is to provide an improved construction and arrangement whereby special bearings can be used at the four sides of the joint in a satisfactory and practical manner.

Another object is to provide a novel and improved construction and arrangement whereby the oil for lubricating purposes may be carried by a chamber within the joint and distributed to the various bearings in a more satisfactory manner than heretofore.

Another object is to provide an improved construction and arrangement whereby the four bearings of the joint may be held together and in place by two members extending crosswise of each other within the central chamber which contains the oil for lubricating purposes.

It is also an object to provide certain details and novel features of construction and combinations tending to increase the general efficiency and desirability of a universal joint of this particular character.

To the foregoing and other useful ends, my invention consists in matters hereinafter set forth and claimed.

In the accompanying drawings—

Fig. 1 shows an assembly of universal joints embodying the principles of the invention.

Fig. 2 is an enlarged side elevation of one of said joints.

Fig. 3 is a section on line 3—3 in Fig. 2.

Fig. 4 is a section approximately on line 4—4 in Fig. 2.

Fig. 5 is a side elevation of the hollow body or central member of said joint.

Fig. 6 is a plan of the said member, showing a portion thereof in section.

Fig. 7 is a perspective of one of the sheet metal caps employed when endwise sliding movement of one of the forks of the joint is desired.

Fig. 8 is a perspective of one of the felt pieces employed in conjunction with said cap to retain the lubricating oil.

Fig. 9 is a perspective of one of the trunnions of the joint.

Fig. 10 is an end elevation of one of the sheet metal fork plates.

Fig. 11 is a perspective of one of the bushings employed in the bearings of said universal joint.

Fig. 12 is a perspective of one of the fiber washers employed in the bearings of said joints.

Figure 13 is a detail sectional view.

As thus illustrated, and referring more particularly to Figs. 2 and 4, the invention comprises a hollow body 1, which may be a casting made from any suitable material. This hollow body is provided with four radially arranged openings or sockets 2, each having an outer flange 3, and each flange being provided with a shallow annular seat or recess 4, so that a narrow rim or edge 5 is formed around the outer edge of each flange. A steel bushing 6 is fitted in each opening or socket 2, its flange being seated in the annular seat or recess 4, and a packing ring 7 is arranged to encircle the outer edge of each bushing and to bear against the rim or edge portion 5 of the flange 3, thereby to provide a tight joint to prevent the escape of the oil, as will hereinafter more fully appear. Trunnions are inserted in said bushings 6, each trunnion comprising a cylindric portion 8 formed with a rectangular end wall 9 which is provided with upstanding and parallel side flanges 10, the head thus formed having an annular seat 11 at the end of the bore 12 thereof, for certain purposes, as will hereafter more fully appear, but for certain other purposes, as will also be explained, two of these trunnions for each universal joint can be formed without the annular seat 11; and each trunnion has a groove or recess 13 which is shown in Fig. 4 as extending around the under side of the flat wall 9 of the trunnion at the end thereof. The flanges 10, it will be seen, are preferably bevelled at their upper edges, so that their upper surfaces slope downward and outward. As shown at the left in Fig. 1, and as shown in Figs. 2 and 4, the universal joint comprises one sheet metal fork plate 14 which is anchored to its trunnions and held against endwise sliding movement relatively thereto, and a similar sheet metal fork plate 15 which has endwise sliding connection with its trunnions, both forks being U-shaped in form, as shown, and the parallel prongs of each fork being held between the flanges 10 of the trunnion. The bore 12 of each trunnion contains one of the end portions of one of the members 16, which latter are formed with threaded sockets 17, and with bent or laterally deflected middle portions 18, whereby said threaded sockets 17 are all in the same plane. The fork 14 has its prongs provided with screw head openings 19 to receive the heads of the screws 20 which engage the sockets 17 of one of the members 16, so that the screw heads 20 are flush with the outer surfaces of the prongs of this fork; but the prongs of the fork 15 are left free to slide endwise between the flanges 10 of its trunnion, the heads of the screws 21 being countersunk in the seats 11 of two of the trunnions, and thereby covered by the prongs of this fork 15, and engaging the threaded sockets 17 of the other member 16, whereby the bushings 6 and the trunnions held therein are all bound together to insure proper distribution of the strain, and to insure a wearing action of the desired character, when the universal joint is in use, as will hereinafter more fully appear. The screws 20, of course, clamp the prongs of the fork 14 tightly in place in their trunnions, and prevent leakage of oil at these points, it being understood that the interior of the member 1 is filled with lubricating oil of suitable character, a small plugged hole or any other suitable means being provided for injecting the oil into said member. The prongs of the fork 15, however, are free to slide endwise in their trunnions, and are preferably lubricated by the oil which finds its way along a groove in the member 16 and around the edges of the heads of the screws 21, so that this fork slides back and forth freely and smoothly in the seats provided by the two recesses or grooves formed between the flanges 10 of the two trunnions. To prevent the escape of the oil around the prongs of the sliding fork a sheet metal cap plate 22 is provided which is adapted to fit over the rectangular head of the trunnion and over the outer surface of the prong of the fork, as shown in the drawings, and which, before it is applied, has four portions 23 which are adapted to be bent upward under the wall 9 to hold the sheet metal cap plate in place.

Felt pieces 24 are interposed between the ends 25 of said sheet metal cap plates and the ends of the rectangular heads of the trunnions to provide a packing at each end of the guide formed between the flanges 10, thereby to prevent the escape of the oil which finds its way slowly from the interior of the universal joint to lubricate the prongs of the sliding fork.

Preferably, as shown, the two U-shaped fork plates are secured to the flanges 26 and 27 of the shafts 28 and 29 by bolts or screws 30, which latter extend through the holes 31 formed in the body portions of the sheet metal fork plates. Also, as shown, each fork plate is provided with a central opening 32 to receive the end portion 33 of the adjacent shaft, this end portion projecting slightly from the face of the flange 26 or 27, thereby to center the fork plate on the shaft. With this construction, of course, the joint can be assembled in the car, when the joint is used on an automobile, without disturbing the adjustment and various parts of the joint itself. As shown in Fig. 1, the shaft 28 extends between two universal joints of this character, as is sometimes required in the transmission of power on motor vehicles or in other situations. Also in Fig. 1 the universal joint shown at the right is somewhat different from the one shown at the left, inasmuch as this joint at the right has no sliding fork, both of the forks being held by screws 20 against endwise sliding movement. In other words, the connection of each fork to its trunnion is of the character shown at the top of the view in Fig. 4, so that four screws 20 are applied to the forks to keep them from sliding endwise. The fork plates are made from sheet metal, by cutting or blanking the metal in the proper manner, and by then bending the prongs to positions at right angles to the disk-like body portion of each fork plate, so that the two prongs will be parallel.

The flat under sides of the walls 9 of the trunnions engage the flat tops of the bushings 6 and form flat bearings in planes at right angles to the axes of the cylindric bearings formed between the sides of the portions 8 and the sides of said bushings, so that each bearing is at right angles to the adjacent flat bearing. The fork and the trunnion and the crossed member 16, with the screws in the ends of the latter, swivel or turn practically as one piece about the axis formed by the trunnion, with a rocking or hinge motion, of course, as is characteristic of any universal joints during the operation thereof. With this construction the said flat bearing and the said cylindric bearing tend to relieve each other of strain in the rocking motion of the joint while transmitting power during the rotation thereof, inasmuch as the torque tends to tilt or tip the trunnions sidewise, and this action tends to transfer part of the pressure from the cylindric bearing to the flat bearing, the forked prongs being held tightly down upon the trunnions at opposite sides by means of the screws and crossed members 16, in the manner described. This tipping action of the trunnions is also counteracted or minimized by the crossed members 16, which latter hold the trunnions inwardly against the centrifugal action to which each trunnion is subject, and which tends to make each trunnion move away from the axis of rotation when the joint is rotated at high speed. Again, this construction makes it easy to take up wear on the flat bearing surfaces and affords opportunity for the easy assembling or disassembling of the joint. The bushings 6, of course, are pressed or forced into the central hollow member 1, and the flanges of these bushings are of such diameter that grooves are formed between their edges and the rims or edges 5 to receive the packing rings 7, which latter may be of fiber or of any other suitable material. The trunnions (8, 9, 10) are preferably steel and case-hardened and have their bearing surfaces ground, and the bushings 6 are preferably formed or made in the same way, thereby to insure smooth operation as well as the required strength, and to insure against undue wear in the use of the joint. The casting or central body 1 can be made of semi-steel or of any suitable metal, and forms a container for the lubricating oil, as well as the connection between the two forks of the joint.

It will be understood, of course, that the under side of each trunnion head is provided with a groove to engage the packing ring 7, each groove being concentric with and somewhat larger than the cylindric portion 8 of the trunnion.

The central deflection 18 in each of the two crossed members 16 provides sufficient clearance between them, of course, so that not only is it true that the sockets 17 are coincident with the axes of the trunnions, but also thereby these two members are free to turn, and do turn, with the trunnions during the operation of the joint. As shown in Fig. 1, the shaft 28 can be easily removed from between the two universal joints, if such is necessary or desirable, simply by removing the bolts or screws 30 which secure the flanges 26 to the disk-like bodies of the fork plates. It will also understood, of course, that an assembly of this kind may involve two universal joints of the kind shown at the right in Fig. 1, or may involve two universal joints of the kind shown at the left in Fig. 1. All of the propeller shafts, of course, may have the projecting end portions 33 if desired, and all of the forks can be made of sheet metal in the manner shown; but, on the other hand, one or more of the forks can be made of sheet metal and the other forks can be made in any suitable or desired manner, and the universal joints shown and described can be combined with any other universal joints, as may be found necessary or desirable in the transmission of power for the driving of an automobile, tractor, truck or other vehicle, or for any other purpose.

It will be understood, of course, that by "lubricating oil" is meant any kind of lubricant which can be employed for this purpose. Grease or oil or other lubricants may be employed, as the invention is not limited to the use of any particular kind or form of lubricant.

What I claim as my invention is:—

1. In a universal joint, the combination of a hollow body to form a lubricating chamber, forks having trunnion bearings on said body, crossed members arranged within said body and extending into said trunnion bearings, and screws inserted in the ends of said members, at least one of said forks being provided with openings for the heads of two of said screws, so that these two screws are insertable and removable through the prongs of this fork, and the four screws constituting the means for binding the crossed members and the trunnion bearings in assembled relation.

2. A structure as specified in claim 1, said crossed members having screw-threaded sockets at opposite ends of each member, which threaded sockets are all in the plane of the axes of said trunnion bearings.

3. A structure as specified in claim 1, the other fork being free to slide endwise on its trunnions, and covering the screws of these trunnions.

4. A structure as specified in claim 1, in combination with bushings interposed between said hollow body and the trunnions, each bushing having a flange providing a flat bearing in a plane at right angles to the axis of the cylindric bearing formed by the inner surface of the bushing.

5. A structure as specified in claim 1, in which the other two screws are similarly inserted through the other fork, so that both forks are clamped rigidly to their respective trunnions.

6. A structure as specified in claim 1, each trunnion bearing having a bushing inserted in said hollow body, with packing rings interposed between the outer edges of said bushings and the outer edges of the body, and each trunnion having an annular groove to engage the adjacent packing ring.

7. A structure as specified in claim 1, in which the other fork has endwise sliding engagement with its trunnions, together with sheet metal caps and packing means to engage the prongs of the sliding fork, the latter being lubricated by oil from the interior of said hollow body, and said cap and packing means being arranged to prevent the escape of said oil.

8. A structure as specified in claim 1, said screws all being in the same plane, and the axes of said trunnion bearings being also located in this plane.

9. A structure as specified in claim 1, said trunnion bearings comprising trunnions having rectangular outer heads and cylindric portions which extend into said hollow member, said crossed members having their end portions shaped to fit the bore of each trunnion, and the threaded sockets in the ends of said crossed members being shorter than the cylindric portions of the trunnions, so that each cross member has two solid end portions which extend a distance into the trunnions, as well as the hollow end portions which are also enclosed by the trunnions.

10. A structure as specified in claim 1, in combination with a shaft having a non-removable flange thereon, one of said forks being removably secured to said flange.

11. A structure as specified in claim 1, in combination with another universal joint, and a shaft between the two joints, the said shaft having non-removable flanges at the ends thereof, and a fork of each joint being removably secured to one flange, each fork having an opening to center it on the end of said shaft.

12. In a universal joint, a pair of forks, means including transverse and externally accessible screws therefor to detachably connect said forks together, a shaft having an integral disk-like flange at its end and means to detachably secure one of said forks flatwise to said flange.

13. A structure as specified in claim 12 said one fork having a tightly occupied opening to center it on the end of said shaft.

14. A structure as specified in claim 12, said one fork being formed from sheet metal and having a disk portion which has said flatwise engagement with said flange.

15. A structure as specified in claim 12, in combination with another universal joint having one fork thereof similarly secured to the other end of said shaft, so that the shaft and its two integral flanges can be easily removed from between the two joints.

16. A structure as specified in claim 1, said crossed members being formed to provide clearance between them to permit each member to turn with its trunnions.

17. A universal joint having crossed binding members therein, forks having prongs, a hollow body enclosing said members, each member having threaded sockets in the ends thereof, trunnion bearings between said prongs and said body, and screws inserted through said prongs and into said sockets, so that the prongs are rigidly held in the trunnions, and whereby the entire joint is held together, the four screws being disposed coincidentally with and in the plane of the axes of said trunnions.

18. A universal joint comprising a pair of forks having their axes disposed at right angles to each other, a connecting member between said forks, bearings between the fork-prongs and the four sides of said member, and screw threaded means including elements which cross each other at right angles at the center of said member to bind the bearings and member together, said means having slotted heads, and the fork-prongs having suitable openings affording seats for said heads.

19. A universal joint comprising a pair of forks having their axes disposed at right angles to each other, a connecting member between said forks, bearings between the fork-prongs and the four sides of said member, and screw threaded means including elements which cross each other at right angles at the center of said member to bind the bearings and member together, said bearings having grooves to receive the fork-prongs for endwise sliding motion therein, thereby to permit removal of said forks without disturbing said means.

20. A universal joint comprising a pair of forks having their axes disposed at right angles to each other, a connecting member between said forks, bearings between the fork-prongs and the four sides of said member, and screw threaded means including elements which cross each other at right angles at the center of said member to bind the bearings and member together, one of said forks being rigidly secured to two of said bearings, and the other fork having a free endwise sliding engagement with the other two bearings.

21. A universal joint comprising a pair of forks, a connecting member embraced by said forks, said member being hollow and having the four sides thereof left open, bearings between these open sides and the fork-prongs, whereby the oil carried in said member is free to enter directly between the relatively movable elements of said bearings, and means in said chamber to hold the bearings in place.

22. A universal joint comprising a pair of forks, a connecting member embraced by said forks, said member being hollow and having the four sides thereof left open, bearings between these open sides and the fork-prongs, whereby the oil carried in said member is free to enter directly between the relatively movable elements of said bearings, one of said forks having a free sliding connection with two of said bearings, and means in said chamber to hold said bearings in place, said means being adapted to feed oil from said chamber to said free sliding connection.

23. A universal joint comprising a pair of forks having their axes disposed at right angles to each other, a connecting member between said forks, bearings between the fork-prongs and the four sides of said member, and screw threaded means including elements which cross each other at right angles at the center of said member to bind the bearings and member together, said member having a chamber for lubricating oil, which chamber contains portions of said means, and the four opposite sides of said chamber being open to expose said bearings to the oil.

WILLIAM T. HENSLEY.